United States Patent

[11] 3,633,753

| [72] | Inventor | Elie Raymond Petitjean<br>Lyon, France |
|---|---|---|
| [21] | Appl. No. | 8,594 |
| [22] | Filed | Feb. 4, 1970 |
| [45] | Patented | Jan. 11, 1972 |
| [73] | Assignee | Comptior de la Filtration Cofi<br>Venissieux, France |
| [32] | Priority | Feb. 4, 1969 |
| [33] | | France |
| [31] | | 6902479 |

[54] TUBULAR FILTER WITH RESILIENT DEFORMABLE SUPPORT
5 Claims, 6 Drawing Figs.

[52] U.S. Cl. ............................................. 210/356,
210/457, 210/497, 55/288, 55/341, 55/378,
55/500
[51] Int. Cl. .................................................. B01d 27/12,
B01d 29/14
[50] Field of Search ............................................. 210/193,
232, 356, 497, 457; 65/500, 288, 341; 55/378

[56] References Cited
UNITED STATES PATENTS

| 934,076 | 9/1909 | Kneuper | 55/500 X |
|---|---|---|---|
| 2,951,553 | 9/1960 | Kirby | 55/288 |
| 3,289,847 | 12/1966 | Rothemund | 210/356 X |
| 3,291,310 | 12/1966 | Marvel | 210/356 X |
| 3,358,316 | 12/1967 | Okun | 55/288 |

Primary Examiner—Samih N. Zaharna
Assistant Examiner—Frederick F. Calvetti
Attorney—Waters, Roditi, Schwartz & Nissen ABSTRACT: A tubular filter for liquids or the like, including a deformable plastic perforate tubular member having a longitudinal slot permitting radial deformation thereof, and a plurality of longitudinal external channels with liquid-flow apertures at their base portions. A perforate cylindrical filter casing encompasses the tubular member and is spaced from the channel bases upon deformation of the member so as to allow filter fluid flow at all times.

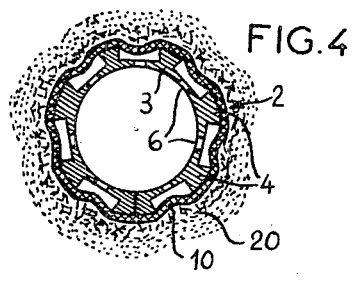
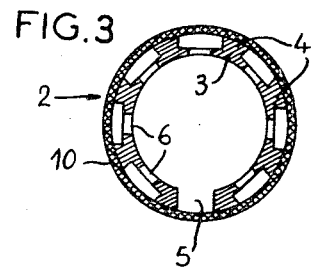
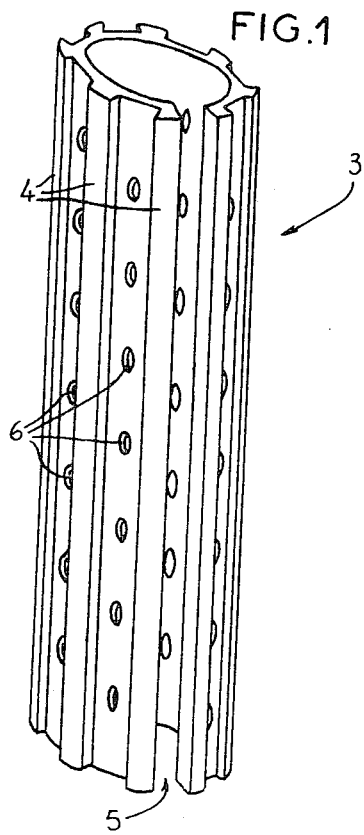
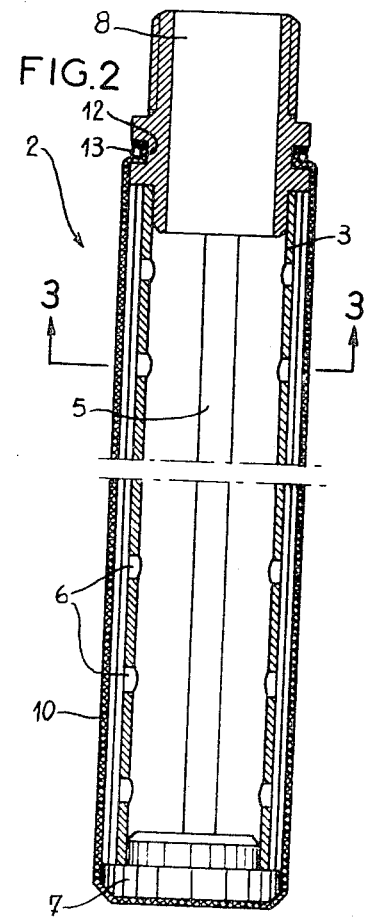

TUBULAR FILTER WITH RESILIENT DEFORMABLE SUPPORT

The present invention relates to tubular filters and more particularly, although not exclusively, to filters with a preliminary bed, and its purpose is also to simplify the construction of these filters and facilitate the automation of the installations in which they are incorporated.

The so-called preliminary bed filters are intended for the filtering of any liquids, such as drinking water, industrial or residual water, effluents, swimming bath water, oils and hydrocarbides and even liquid foodstuffs or other liquids. For completing the filtering action of these filters, use is made of additives such as diatomaceous earth, also known as infusorial earth or kieselguhr, or asbestos powders and cellulose powders, or again, of active carbons in a pulverous state.

The tubular filters of this type generally comprise either a filter plate on which the filtering additive rest and through which the fluid to be filtered passes, or a multiplicity of cylindrical filtering elements or filter plugs to the periphery of which the additive or additives are applied.

In the plug-type filters in use at present, the plugs consist of perforated cylindrical tubes, generally made of stainless steel, in order to combat corrosion, and covered with a metal fabric, likewise of stainless steel, this latter being the support of the additive. Other types of plug are in existence, taking the form, for example, of a stack of rings, or based on a perforated cylindrical tube onto which is wound a wire of cylindrical or trapezoidal cross section in accordance with a certain particular winding pitch, in such a way as to leave a sufficiently narrow space to prevent the ingress of the additives, while at the same time giving passage to the fluid to be filtered.

The operation of these filters consists of three essential phases:

1. The provision of the plugs with their preliminary bed, in which operation the water or fluid to be filtered is conveyed into the filter but with certain definite proportions of additive. This operation is continued until a sufficient deposit of additive is produced on the plugs. This deposit constitutes what is known as the "filter cake," which will enable the fluid to be clarified.
2. The filter is put into operation. The operation of providing it with its preliminary bed having been completed, the fluid to be filtered is supplied direct to the plugs and passes through the filter continuously, being subjected to the action of a pump.
3. The washing of the filter. This operation is required when the "cake" of additive is saturated with impurities, after a certain period of use. It consists of isolating the filter and subjecting the plugs to a counterflow of water and possibly of compressed air in the opposite direction to that taken by the flow when the filter is in actual operation. The water entering the plugs and moving to the outside takes along with it the cake of additive and the impurities deposited therein.

The first drawback of these filters resides in the cost of the plugs of which they consist and which have to be made of stainless steel in order to obviate the risk of corrosion.

A second drawback relates to the washing of the plugs and resides in the fact that this washing process necessitates not only a secondary apparatus, sometimes considerable, according to the capacity of the filter, but also manual intervention by the operator in charge of the plant.

Furthermore, these washing operations frequently consume a considerable quantity of water.

The purpose of the present invention is therefore to remedy these drawbacks. For this purpose, it concerns a tubular filter with or without preliminary bed, of the type comprising a perforated tube, closed at one of its ends and fitted at its other end with a union enabling it to be affixed to a support plate, and mounted inside a cylindrical casing of filter fabric, of which the internal diameter corresponds to the external diameter of the tube, characterized by the fact that the tube is made of plastic or other elastic material and is provided with a longitudinal slit and external channels at the base of which are provided the perforations required for the flow of the fluid to be filtered, and by the fact that the width of the longitudinal slit and the dimensions of the channels are such that when the two lips of the slit are in contact, owing to the radial deformation of the tube, the filter fabric cannot come in contact with the base of the channels.

As the filter operates, the differential pressure between its internal and external faces increases as a result of the increase in the pressure losses resulting from the impurities therein. The longitudinal slit therefore tends to close up and the filter casing to curve in the channels. If the pump for the circulation of the fluid to be filtered is brought to a stop, the differential pressure is suddenly reduced to zero and the filter casing suddenly restored to its original cylindrical shape, owing to the elasticity of the channelled tube. A kind of expansion thus takes place on the filter casing and results in the ejection of the impurities which have accumulated on its external face, or breaks and expels the "cake," if the filter had first been covered with this latter.

It is of advantage for the fabric of which the filter casing is made to consist of synthetic fibers such as superpolyamide, propylene etc.

Preferably, that end of the casing which corresponds to the closed end of the tube will be closed, and the casing can be affixed, by its other end, to the other extremity of the tube, by any suitable means, such as an adhesive, a sealing system, circlips etc.

At all events, the invention will be satisfactorily understood by means of the following description, by reference to the schematic diagram attached, representing a preferred version of this tubular filter, without any limitative effect.

FIG. 1 is a view, in perspective, of the channelled tube incorporated in the structure of the filter.

FIG. 2 is an axial section through the filter covered by the invention.

FIG. 3 is a section along the line 3—3 of FIG. 2.

FIG. 4 is a view similar to the preceding diagram but after a certain period of operation.

Figure 5:
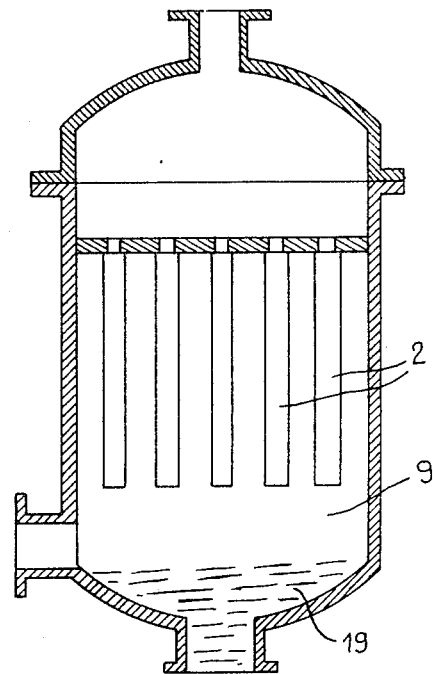
FIG. 5 is an axial section through a filtering assembly comprising several filters in accordance with the invention.

This tubular filter or supporting plug 2 consists essentially of a cylindrical tube 3, of elastic plastic and comprising a multiplicity of channels 4 over its entire periphery.

This tube is also provided with a longitudinal slit 5 and comprises a multiplicity of perforations 6, cut in the base of the channels 5. It is also closed at its lower end by a stopper 7, preferably of an elastic material.

At its upper end the tube 3 is fitted with a screw-threaded union 8 enabling it to be affixed to the supporting plate of a filtering assembly. This union is affixed to the tube 3 by any suitable means, such as an adhesive, a sealing system or some other device.

A filtering fabric in the form of a cylindrical casing 10 entirely covers the tube 3, the stopper 7 and part of the union 8. It is fixed to this latter by being gripped in a groove 12 by the aid of a circlip 13. This casing could, however, be affixed by any other suitable means, e.g., by an adhesive, a sealing system or similar device.

It should be noted that the diameter of the filter casing 10 is accurately adjusted to the external diameter of the channeled tube 3.

Figure 6:
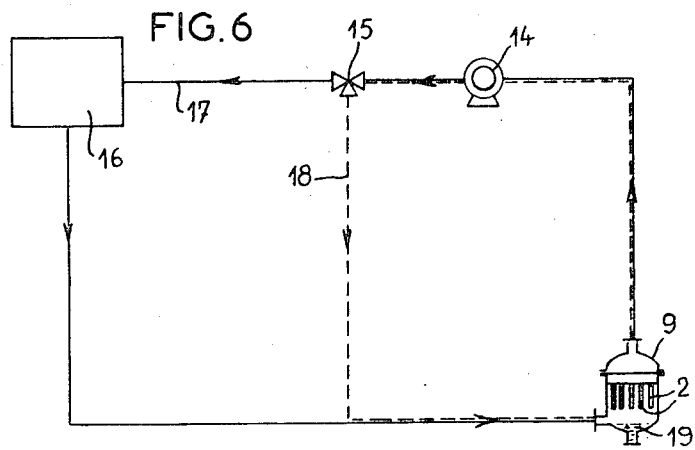
FIG. 6 is a schematic diagram of the circuit of a filter installation equipped with filters according to the invention.

The operation of this supporting plug is thus as follows:

The circuit shown in FIG. 6 comprises a filtering assembly 9 equipped with tubular filters 2 in accordance with the invention, a pump 14, a three-way valve 15, a utilization site 16, which may be a swimming bath, tank or any other installation, a utilization circuit 17, shown in continuous heavy lines, and a circuit 18, known as the preliminary bed circuit and shown in broken fine lines.

The provision of the filters 2 with the preliminary bed is effected in the same way as for those of the conventional type:

the additive 19 is placed in the lower part of the vat for the filter assembly 9, and the preliminary bed circuit 18 is put into operation, in the direction shown by the arrows in FIG. 6. The "prebedding operation" is carried out for a certain time, during which the additive deposits itself on the periphery of the filters 2, thus forming the "cake." At the end of this operation the "prebedding circuit" is interrupted by means of the electrovalve 15 and the utilization valve 17 put into operation by the former valve.

The circulation of the fluid to be filtered takes place in the direction shown by the arrows in FIG. 6 and corresponds, in relation to the filters 2, to a circulation from the exterior to the interior.

The circulation of the fluid being forced, by the action of the pump 14, each plug with its "cake" 20 is subjected to a pressure, and created a pressure loss. This latter increases according to the impurities entering the "cake" of the filter concerned.

The resulting difference between the external and the internal pressure, or the differential pressure, acts on the filter casing 10 and causes the tube 3 to tighten until the two lips of the slit 5 touch, as shown in FIG. 4.

As this diagram likewise indicated, the casing 10 curves in the middle of each channel 4, but the width of the slit 5 and the dimensions of these channels are such that the casing 10 cannot come in contact with them to give passage to the fluid along these channels. The fluid is then discharged to the upper part of the vat of the filtering assembly 9 after passing into the center of the filters 2 as a result of the perforations 6.

If at this moment the pump 14 is shut off, the differential pressure suddenly becomes zero. The tube 3 then suddenly returns to its position of rest, causing further tension to occur in the casing 10 and resulting in the disappearance of the hollows previously formed.

This sudden tension in the casing 10 causes the bursting of the "cake" 20 hitherto formed by the additive and the impurities retained, and it falls to the bottom of the filter by gravity.

If the additive is regarded as free of an excessive quantity of impure matter, so that it can be reutilized for a further "cake," it is sufficient to restore the "prebedding" circuit in the installation, until a new "cake" is obtained.

The result of the stoppage of the pump is thus to "aerate" the "cake." It will easily be understood that this operation can be rendered automatic without difficulty. It suffices to include in the installation a differential pressostat which will shut off the pump 14 when the differential pressure reaches a certain preselected level, and which will then restart it, after a relatively short time, and cause the valve 15 to assume the "prebedding" position. The reverse operation of this valve can likewise be brought about by the same pressostat when the differential pressure has reached a predetermined limit corresponding to the completion of the formation of the "cake."

If the additive is considered irrecoverable, e.g., after a certain number of "aeration," the pump 14 must remain shut off, in order to enable the operator to replace the used additive by fresh additive.

The discharge of the additive is effected by the discharge valve 11, provided in the lower part of the vat of the filtering assembly 9.

In all cases, therefore, the "cake" cannot be broken simply by conveying a counterflow into the filters 2, but only by shutting off the pump 14.

It should be noted that the higher the differential pressure at which the operation of the filter is to be brought to a stop, the more sudden will be the expansion of the tube 3 as a result and the more effective the action of breaking the "cake."

All these operations are effected automatically, without any manual intervention, and this considerably increases the efficiency of an installation and simplifies its operation.

I claim:

1. A tubular filter comprising in combination; a perforated resiliently deformable plastic tubular member, means at one end of said member including a threaded portion for fastening engagement with a support plate, means for closing off the opposite end of said member, said tubular member including a longitudinal slot extending along the full length thereof, a plurality of longitudinal channels extending about the outer peripheral surface of said member, a plurality of fluid-flow apertures extending through the base of each of said channels forming perforations for the flow of filter fluid through said member; and an essentially cylindrical member of perforate resilient material encompassing said tubular member, said channels being dimensioned so that upon radial deformation of said tubular member tending to close the slot, the inner surface of said cylindrical member remains in spaced relationship with the base of said channels, said deformable member and said cylindrical member being constructed and arranged so that fluid to be filtered flows from the exterior of the cylindrical member to the interior of the deformable member and said slot closes due to the pressure differential across the cylindrical and deformable members, and when the flow stops, the deformable and the cylindrical members expand thereby ejecting any filtered solids from the exterior of the cylindrical member.

2. A filter as claimed in claim 1, wherein the filter material of said cylindrical member comprises synthetic fibers from the group consisting of superpolyamide and propylene.

3. A filter as claimed in claim 1, wherein the end of said cylindrical member adjacent the closed end of said tubular member is closed; and means for fastening the other end of said cylindrical member to said plastic tubular member.

4. A filter as claimed in claim 3, wherein said fastening means comprises and adhesive fastener.

5. A filter as claimed in claim 3, wherein said fastening means comprises a resilient clamping ring.

* * * * *